E. J. HOOPER.

RUBBER HEEL.

APPLICATION FILED JUNE 19, 1918.

Reissued Feb. 25, 1919. 14,596.

INVENTOR.

Edward J. Hooper by his attorneys

Van Fossen, Frick & Hildreth

UNITED STATES PATENT OFFICE.

EDWARD J. HOOPER, OF STOUGHTON, MASSACHUSETTS, ASSIGNOR, BY MESNE ASSIGNMENTS, TO BURTON W. CARY, OF WINCHESTER, MASSACHUSETTS.

RUBBER HEEL.

14,596. Specification of Reissued Letters Patent. Reissued Feb. 25, 1919.

Original No. 1,236,174, dated August 7, 1917, Serial No. 41,151, filed July 21, 1915. Application for reissue filed June 19, 1918. Serial No. 240,855.

*To all whom it may concern:*

Be it known that I, EDWARD J. HOOPER, a citizen of the United States, residing at Stoughton, Massachusetts, have invented a certain new and useful Improvement in Rubber Heels, of which the following is a specification, reference being had to the accompanying drawings, forming a part thereof.

This invention relates to a certain new and useful improvement in rubber or cushion heels for boots, shoes and the like, the objects principally of my present invention being to provide a heel of the kind and for the purpose stated of simple and inexpensive form and construction, which may be readily, conveniently, and quickly operatively attached firmly and securely upon the shoe or the like, which, when operatively applied and fixed upon the shoe-heel, will neatly register at its edges therewith, and which is capable of approximately maximum wear without its fastening means becoming exposed, and to improve generally upon and simplify the construction of heels of the kind described.

With the above and other objects in view, my present invention resides in certain novel features of form, arrangement, construction, and combination of parts, all as will hereinafter be described and afterward pointed out in the claims.

In the accompanying drawing,

Fig. 6 is an inverted plan view of the tool or spanker-plate which I prefer to employ in connection with my new heel when fastening or attaching the same manually upon a shoe or the like.

Figure 1:
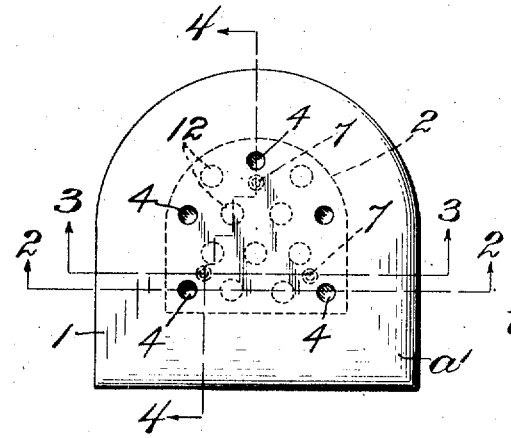
Figure 1 is a plan view, showing the under face or surface, of a rubber or cushion heel embodying my invention.

Referring to the said drawing, in which like reference characters refer to like parts throughout the several views, my new heel comprises or includes a body-member 1 formed or made of rubber or other analogous resilient or cushioning material and which may be of various sizes and outlines, as desired, to neatly fit and correspond with the sizes and outlines, respectively, of the particular shoe heels or the like to which my new heels are adapted to be fixedly attached. This body-member 1, which is of any suitable thickness to provide a comfortable elastic or resilient cushion, is preferably, for purposes hereinafter appearing and as illustrated particularly in Fig. 4, normally, that is to say, as manufactured and prior to attachment of the heel upon a shoe or the like, concaved at its upper surface, as at *a*, and correspondingly convexed at its under or tread surface, as at *a'*.

Embedded flatwise and approximately centrally within body-member 1 and forming substantially an integral part of the heel, is a relatively small flat metallic plate 2, laterally projecting integrally from one side of which through the upper portion of body-member 1 is a plurality of pointed members or nails 3. These nails 3, which, as illustrated in Fig. 5, are preferably in a series around plate 2 adjacent its edge or margin, are of such length relatively to the thickness of the upper portion of body-member 1 as to extend or protrude at their pointed or shoe-engaging portions suitably beyond the plane of the upper face or surface of body-member 1, as clearly seen in Fig. 4.

Figure 7:
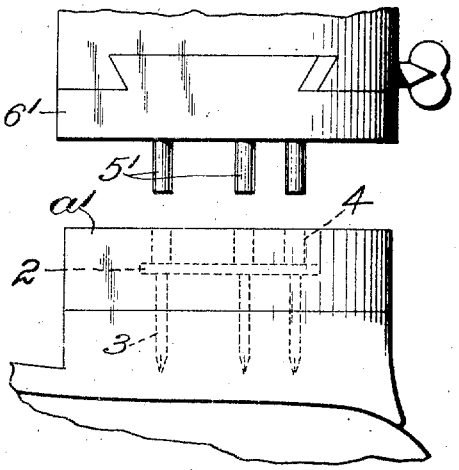
Fig. 7 is a side elevational view illustrating the fastening of my new heel upon a shoe through the use or employment of a machine-operated spanker-plate.
Figure 6:
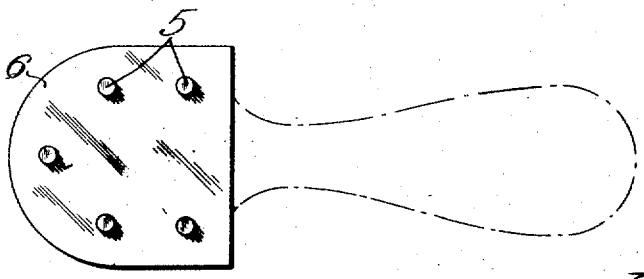

Provided in body-member 1 on its opposite or tread portion and preferably coincident or in alinement, respectively, with nails 3 of plate 2, are countersunk approximately cylindrical openings or recesses 4 of suitable depth adapted to receive either the pegs or lugs 5 of a manually operable heel-attaching or spanker-plate 6, illustrated in Fig. 6, or the pegs or lugs 5' of a machine operable heel-attaching or spanker-plate 6′, illustrated in Fig. 7.

Figure 2:
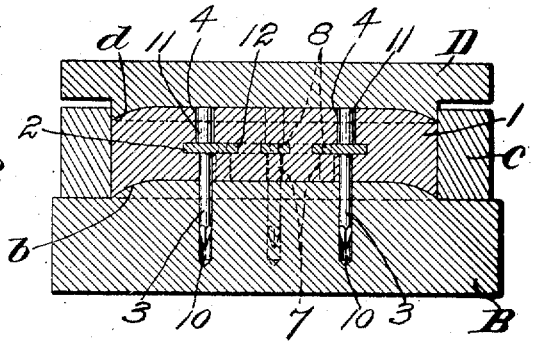
Fig. 2 is a sectional view through the same taken approximately on the line 2—2, Fig. 1, the same being shown in finished form in connection with, and prior to its removal from the producing mold.

In manufacturing my new heel, I preferably employ a mold such as is illustrated in Fig. 2. This mold includes a base-member B, an intermediate member C, and a top or movable member D. Base member B, within the confines of intermediate member C, has a raised upper face or surface convexed at its margin, as at *h*, to form the, as it might be described, depressed upper surface of body-member 1 with its normally concaved marginal portion *a*, top member D being correspondingly provided with a, as it also might be described, recessed under face or surface concaved at its margin, as at *d*, to form the tread surface of body-member 1 with its normally convexed marginal portion *a′*. Base member B is further provided on its upper surface or face with a plurality of suitably positioned or arranged upstanding projections or lugs 7 adapted to properly support plate 2 flatwise approximately centrally in the mold, projections or lugs 7 being reduced at their upper ends to provide shouldered portions 8 adapted to loosely fit in and engage with small perforations 9 in plate 2 to hold plate 2 in proper position in the mold during the process of manufacture of the heel. Countersunk in base B of the mold is a plurality of approximately cylindrical recesses 10 of suitable depth adapted to accommodate the projecting or protruding portions of nails 3 of plate 2. Projecting downwardly from the under face of mold top member D is a plurality of lugs or the like 11 adapted to form said cylindrical recesses 4 of body-member 1.

Plate 2 being positioned as described within the mold, the proper weight or amount of rubber or other analogous material in a soft or plastic condition or state, as will be understood, is suitably placed in the mold around plate 2, and the mold then closed for vulcanization or other rubber hardening process. As shown in Fig. 5, plate 2 is also provided transversely with a plurality of openings 12, through which penetrates the soft or plastic rubber or other material when poured or placed in the mold, whereby plate 2 is thoroughly and firmly centrally anchored, during the vulcanization or other rubber hardening process, in body-member 1, with its integral nails 3 protruding from body-member 1, as described. The mold being subjected to suitable pressure and vulcanization or other rubber hardening process being now had, the heel, when removed from the mold, has the form and construction described.

The heel so formed and having the characteristics or features stated is now ready to be attached or fixed upon a shoe or the like, which may be easily and conveniently accomplished through the use or employment of the hand spanker-plate 6 or the machine spanker-plate 6′, the pegs or projections 5 or 5′ of the same, respectively, being adapted to neatly fit said recesses 4 of body-member 1. A heel of proper size and outline being placed upon a shoe and either of said spanker-plates being engaged, as described, with the heel, on suitable pressure, a blow, or the like being applied to and upon the spanker-plate, the force thereof will be transmitted or imparted approximately directly to and upon plate 2 and its integral nails 3 consequently driven into the shoe-heel. In such operation, body-member 1 will be flattened against the underside of the shoe-heel and its edge or marginal portion caused to neatly register with the outline of the shoe-heel, body-member 1 losing its described normal shape or form. This flattening or flexing of the heel will to a certain extent place body-member 1 under tension, that is to say, body-member 1 will have a constant tendency, under its inherent elasticity or resiliency, to return to or regain its described normal form or shape, and body-member 1 at and throughout its edge or marginal portion will accordingly tightly hug or press approximately flatwise against the under side of the shoe-heel. Thus the heel, though free from nails or the like and hence substantially unattached at its marginal portion from the shoe-heel, will be held by nails 3 and its own inherent elasticity or resiliency firmly and securely in close flat contact throughout its area with the shoe-heel. It will be noted by reference to Fig. 4 that body-member 1 is preferably of slightly greater thickness at its edge or marginal portion to increase the wearing properties of the heel, the wear upon a shoe-heel being usually greatest at its rear marginal edge.

My new heel may be cheaply and economically manufactured, and from the foregoing it will be seen that, due to the peculiar and novel construction of my new heel and the arrangement and position of plate 2 and its nails 3 relatitvely to body-member 1, the heel may not only be quickly, easily, securely, and most conveniently fixed upon the shoe-heel, but also is capable of approximately maximum wear without plate 2 becoming exposed.

Figure 3:
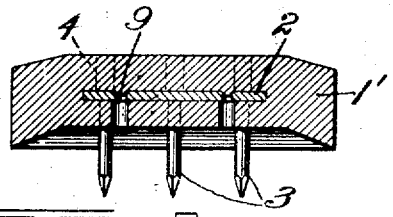
Fig. 3 is a sectional view through a slightly modified form of heel embodying my invention taken through the heel on a line such as approximately line 3—3 of Fig. 1.
Figure 4:
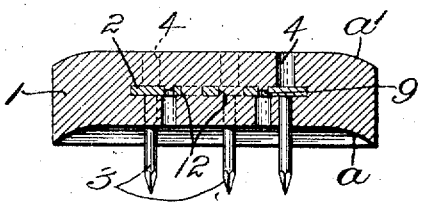
Fig. 4 is a sectional view through the heel on approximately the line 4—4, Fig. 1.
Figure 5:
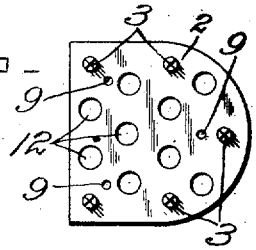
Fig. 5 is an inverted plan view of the heel-fastening member or plate forming an integral part of my new heel.

The modified form of my new heel shown in Fig. 3 differs from the preferred form thereof hereinbefore described merely in that the marginal portion of body-member 1′, instead of having the normal curved or concavo-convexed form shown in Fig. 4, is more sharply or obliquely disposed to the central part of the heel; and it is to be understood that other changes in the form, construction, arrangement, and combination of the several parts of my new heel may be made and substituted for those herein shown and described without departing from the nature and principle of my invention.

Having thus described my invention, what I claim and desire to secure by Letters Patent is:

1. The cushion heel for boots, shoes, and the like herein described, the same including a body-member of rubber having an outline to correspond with the outline of the usual boot or shoe, said body-member having transversely greater thickness at its marginal portion than at its central portion and being formed with opposite tread and attaching-faces approximately flat throughout their central portions, the body-member at its thicker marginal portion only being concaved on its attaching-face and convexed on its tread-face.

2. A heel construction comprising an elastic body having a flat central base portion provided with a heel-engaging side and a tread surface, said side and surface lying in parallel planes, an integral bevel portion projecting from and extending entirely around said base portion, the marginal edge of the heel-engaging side of said bevel portion lying in a single plane, and means for fastening said body upon the heel of a shoe.

3. A heel construction comprising an elastic body having a flat central base portion provided with a heel engaging side and a tread surface, said side and surface lying in parallel planes, an integral bevel portion of gradually increasing thickness projecting from and extending entirely around said base portion, the marginal edge of said heel engaging side lying in a single plane, and means for fastening said body upon the heel of a shoe.

4. A rubber heel for boots and shoes consisting of an elastic or resilient body-member normally of concavo-convex form, having embedded flatwise and approximately centrally within the body-member a relatively small metallic plate provided with a plurality of pointed nails of such length relatively to the thickness of the upper portion of the body-member as to extend or protrude beyond the upper face or surface of the body-member, adapted to be driven into the shoe-heel, thereby flattening the body-member against the under side of the shoe heel and placing the body-member under tension so that it will have a constant tendency to return to or regain its normal form or shape and throughout its edge or marginal portion will accordingly tightly hug or press flatwise against the under side of the shoe heel.

5. A rubber heel for boots and shoes consisting of a body-member comprising a substantially flat central portion having a margin concave on its upper or attaching surface and convex on its under or tread surface, a relatively small metallic plate embedded in the body-member approximately central thereof, and a plurality of nails integrally connected to the plate and projecting beyond the attaching surface to secure the central portion of the heel to a shoe, the dimensions of the plate being such as not to substantially interfere with the distortion of the marginal portion of the heel when flattened on the shoe heel.

In testimony whereof, I have signed my name to this specification.

EDWARD J. HOOPER.